(12) United States Patent
Takaba et al.

(10) Patent No.: US 12,738,889 B2
(45) Date of Patent: Sep. 15, 2026

(54) OUTPUT LINE CONNECTION STRUCTURE FOR SOLAR CELL MODULE

(71) Applicant: SHARP KABUSHIKI KAISHA, Sakai City (JP)

(72) Inventors: Yoshiroh Takaba, Sakai City (JP); Yasushi Yoshikawa Funakoshi, Sakai City (JP)

(73) Assignee: SHARP KABUSHIKI KAISHA, Sakai City (JP)

( * ) Notice: Subject to any disclaimer, the term of this patent is extended or adjusted under 35 U.S.C. 154(b) by 0 days.

(21) Appl. No.: 18/842,551

(22) PCT Filed: Aug. 24, 2023

(86) PCT No.: PCT/JP2023/030401
§ 371 (c)(1),
(2) Date: Aug. 29, 2024

(87) PCT Pub. No.: WO2024/057854
PCT Pub. Date: Mar. 21, 2024

(65) Prior Publication Data

US 2025/0167728 A1 May 22, 2025

(30) Foreign Application Priority Data

Sep. 12, 2022 (JP) ................................ 2022-144527

(51) Int. Cl.
*H02S 40/36* (2014.01)
*H02S 40/34* (2014.01)

(52) U.S. Cl.
CPC ............. *H02S 40/36* (2014.12); *H02S 40/34* (2014.12)

(58) Field of Classification Search
None
See application file for complete search history.

(56) References Cited

U.S. PATENT DOCUMENTS 6,380,478 B1 * 4/2002 Yamamoto ............. H10F 19/80 136/258
2010/0175743 A1 * 7/2010 Gonzalez ............... H02S 40/34 136/251
2012/0262948 A1 * 10/2012 Lee ......................... H02S 40/34 363/16
2017/0133536 A1 5/2017 Hasegawa et al.

FOREIGN PATENT DOCUMENTS

JP 6635389 B2 1/2020
KR 101039050 B1 * 6/2011 ............ H02S 40/34

OTHER PUBLICATIONS

Machine translation of KR101039050B1 (Year: 2011).*

* cited by examiner

*Primary Examiner* — Ryan S Cannon
(74) *Attorney, Agent, or Firm* — ScienBiziP, P.C.

(57) ABSTRACT

A solar cell module includes a solar cell string sealed between a transparent substrate and a back surface protection member. The solar cell string includes solar cell connection units in each of which a plurality of solar cells adjacent in a first direction is connected in series with each other. Each of the solar cell connection units is provided with an output wiring member. The output wiring member extends to an outside through the back surface protection member. Outlets and a terminal box are positioned apart from each other in an in-plane direction of the back surface protection member.

5 Claims, 8 Drawing Sheets

OUTPUT LINE CONNECTION STRUCTURE FOR SOLAR CELL MODULE

TECHNICAL FIELD

The present disclosure relates to an output line connection structure for a solar cell module.

BACKGROUND ART

A solar cell module includes solar cell strings in which a plurality of solar cells as power generating elements is electrically connected in series. Bypass diodes for diverting one or more solar cell strings are often provided on the current path. The bypass diodes are electrically connected in parallel with the respective solar cell strings. When a trouble occurs in a part of the solar cell strings, an electric current is allowed to flow without passing the troubled solar cell string(s).

Typically, bypass diodes are provided inside a terminal box for extracting an output from the solar cell module. In a conventional structure exemplified in FIG. 7, output wiring members 62 are drawn out from a slit 61 formed in a back surface 602 side of a solar cell module 60, and a terminal box 63 for extracting an output from the solar cell module 60 is attached to cover the output wiring members 62. External connection cables 64, each having a connector 65 at an extreme end thereof, extend from the terminal box 63.

For example, a solar cell module disclosed in PTL 1 has a following structure. From a solar cell at an end of a line of string, first wiring members extend in a lengthwise direction and are connected with second wiring members. The second wiring members connect adjacent strings in a transverse direction to form a group of strings. A terminal box connected to the group of strings is provided on a back side of a back surface protection member.

PRIOR ART DOCUMENTS

Patent Documents

PTL 1: Japanese Patent No. 6635389

SUMMARY OF INVENTION

Technical Problem

An arrangement mode according to the above-mentioned solar cell module of the conventional structure is shown in FIG. 8, for example. In this arrangement mode, six solar cells 71 are connected in series by first wiring members 73 and arranged in a line in a first direction D1 to form a connection unit 72, and six lines of connection units 72 are arranged in a second direction D2. At a first end in the first direction D1 (a lower end in the drawing), adjacent connection units 72, two lines each, are connected in series with each other by second wiring members 74 that extend in the second direction D2. At a second end in the first direction D1 (an upper end in the drawing), third wiring members 75 each connected to a line of connection unit 72 and third wiring members 75 each connected to two lines of connection units 72 are disposed in the second direction D2. These third wiring members 75 are connected to a terminal box 76 on a back surface side of the solar cell module 70. The terminal box 76 contains bypass diodes (not shown) to which the third wiring members 75 are connected.

When the solar cells 71 are partially shaded due to changes in seasons or insolation hours, the shading impairs power generation and deteriorates power generating capacity in two lines of connection units 72 including the shaded solar cells 71. However, the solar cell module can still extract an output from four lines of connection units 72 including the other solar cells 71. This configuration can prevent deterioration in power generation efficiency in the solar cell module 70.

In order to extract an output from the solar cell module of the conventional structure, however, a plurality of second wires 75 extending in the second direction at the first end in the first direction D1 is enclosed in the solar cell module as far as the position of the terminal box 76, by being arranged in a plurality of lines and disposed on the back surface side of the solar cells 71. This structure not only requires routing of the second wiring members 75 inside the solar cell module, but also requires insulation of the second wiring members 75 between the solar cells 71 and the back surface protection member. A complex wiring structure and an increase in operational steps are recognized as problems in the solar cell module of the conventional structure.

The present disclosure is made in view of the above-mentioned problems, and intends to provide an output line connection structure for a solar cell module that can avoid complex wiring of the output wiring members that constitute the solar cell module and thus can simplify an internal wiring, and that can reduce the influence of shading that affects a part of the solar cells.

Solution to Problem

According to the present disclosure, a solution for achieving the above-mentioned object provides an output line connection structure for a solar cell module, for connecting output wiring members in the solar cell module with a terminal box. The solar cell module includes a solar cell string sealed between a transparent substrate and a back surface protection member, the solar cell string including a plurality of solar cells connected in series with each other. The solar cell string includes solar cell connection units in each of which a plurality of solar cells adjacent in a first direction is connected in series with each other. Bus bars are provided at a starting end and a terminating end of each of the solar cell connection units, such that two of the solar cell connection units that are adjacent in a second direction orthogonal to the first direction are connected in series with each other. Each of the output wiring members has a first end thereof connected to a corresponding one of the bus bars, and has a second end thereof establishing electrical continuity with the terminal box. Each of the output wiring members extends to an outside of the back surface protection member through an outlet that penetrates the back surface protection member. The outlets of the output wiring members and the terminal box are positioned apart from each other in an in-plane direction of the back surface protection member.

Preferably, in the output line connection structure for a solar cell module according to the above configuration, the outlets are provided at a plurality of locations at opposite ends in the first direction of the back surface protection member.

Preferably, in the output line connection structure for a solar cell module according to the above configuration, a portion of each output wiring member extending from the outlet to the outside is insulated by coating. In this case, each of the output wiring members may be equipped with a connection wiring member insulated by coating, and may be connected from the outlet to the terminal box via the connection wiring member.

Preferably, in the output line connection structure for a solar cell module according to the above configuration, the terminal box includes a plurality of terminals and a plurality of bypass diodes, the plurality of terminals being respectively connected to the output wiring members, and the plurality of bypass diodes being respectively connected in parallel with the plurality of solar cell connection units. Preferably, in this case, each of the bypass diodes disposed in the terminal box is electrically connected between the starting end and the terminating end of a corresponding one of the solar cell connection units.

Advantageous Effect of Invention

The present disclosure can avoid complex wiring, can reduce the influence of shading that affects a part of the solar cells constituting the solar cell module, and can prevent deterioration in power generation efficiency.

DESCRIPTION OF EMBODIMENTS

Output line connection structures for a solar cell module according to embodiments of the present disclosure are described with reference to the drawings.

Figure 1:
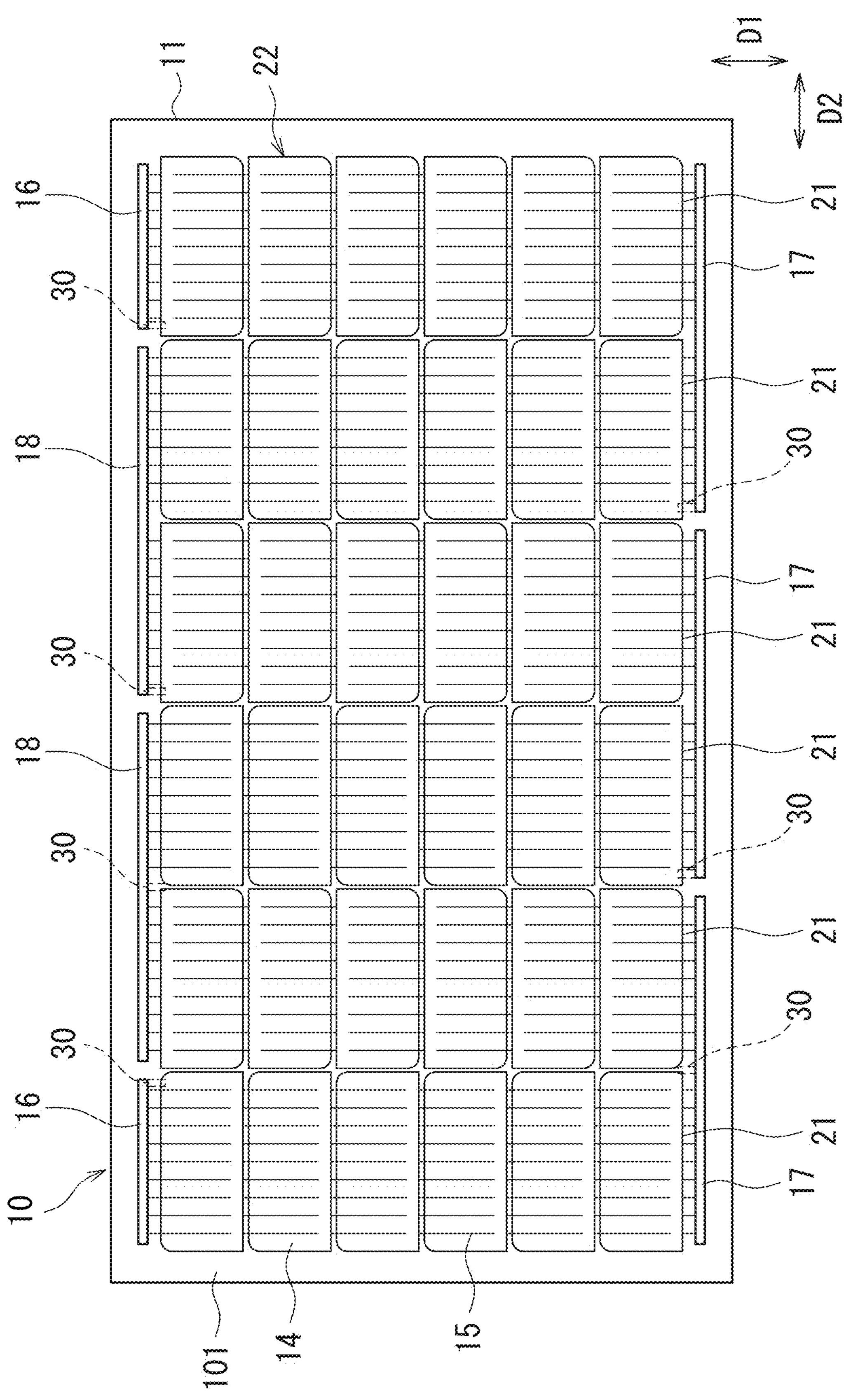
FIG. 1 is a schematic plan view of an output line connection structure for a solar cell module according to an embodiment of the present disclosure.
Figure 2:
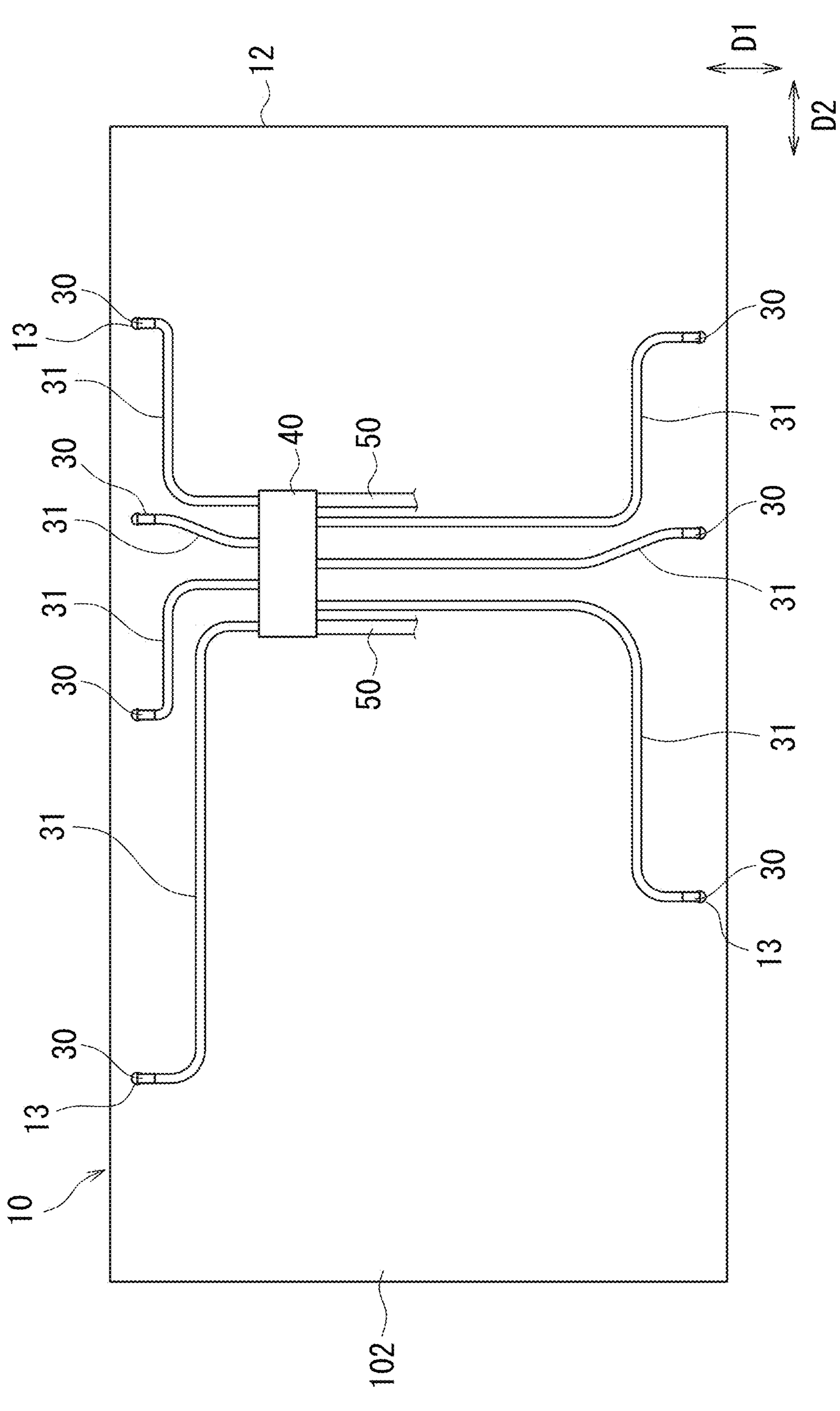
FIG. 2 is a schematic bottom view showing the output line connection structure for a solar cell module.

FIG. 1 and FIG. 2 schematically show an output line connection structure for a solar cell module 10 according to an embodiment of the present disclosure. FIG. 1 is a plan view showing a light-receiving surface 101 side of the solar cell module 10. FIG. 2 is a bottom view showing a back surface 102 side of the solar cell module 10.

In the following description of the solar cell module 10, the light-receiving surface 101 means a surface on which the sunlight is mainly incident, and the back surface 102 means a surface opposite to the light-receiving surface. Note that FIG. 1 and FIG. 2 omit a resin sealing layer in the solar cell module 10, and provide a see-through illustration of solar cells 14 through a transparent substrate 11 that is made of clear glass or the like and laminated on the solar cells 14.

The solar cell module 10 is composed of the transparent substrate 11 on the light-receiving surface 101 side, a back surface protection member (back sheet) 12 on the back surface 102 side, and a solar cell string 22 and some other components sealed therebetween. The solar cell string 22 includes a plurality of solar cells 14. Light is incident on the solar cells 14 through the transparent substrate 11. The solar cells 14 are flat plate-like photovoltaic elements that generate electric power in response to light irradiation. The solar cells 14 adjacent in a first direction D1 are connected in series with each other by conductive wiring members 15.

The plurality of solar cells 14 is arranged in a matrix along the first direction D1 and a second direction D2 orthogonal to the first direction D1. Each of the solar cells 14 has a flat plate-like shape. The configuration shown in FIG. 1 uses, for example, split cells for which solar cell substrates having a size of about 156 $mm^2$ are split into two pieces.

Split cells, as used herein, mean small-size cells prepared from a standard-size cell (a cell for one solar battery wafer, also called full cell) split into certain pieces. As an example of the split cells, a standard-size cell may be split into half (half cells). Split cells can reduce the value of current per cell (a half cell can reduce the current value by half), and can reduce power loss in the solar cell module 1 accordingly.

Besides, split cells can increase the number of serial connections in comparison with standard-size cells, and can thereby raise the voltage. In the illustrated configuration, the solar cells 14 are half cells. Although the solar cells 14 in the illustrated configuration are prepared from standard-size cells split into half, standard-size cells may be split into three or four to provide split cells. Additionally, a half cell may be split further into half to provide split cells having a substantially square shape.

The solar cell string 22 provided in the solar cell module 10 includes solar cell connection units 21. In each solar cell connection unit 21, a plurality of solar cells 14 adjacent in the first direction D1 in the drawing is connected in series with each other. In FIG. 1, six solar cells 14 are aligned in the first direction D1 and connected in series by the wiring members 15 to form one solar cell connection unit 21. The solar cell connection units 21 adjacent in the second direction D2 are connected, two by two, in series with each other by bus bars 17 and bus bars 18 to form the solar cell string 22.

At a first end in the first direction D1 (an upper end in the drawing) of the solar cell module 10, adjacent solar cell connection units 21 are connected in series with each other via the bus bars 18 to which the wiring members 15 are connected. At a second end (a lower end in the drawing) of the solar cell module 10, adjacent solar cell connection units 21 are connected in series with each other via the bus bars 17 to which the wiring members 15 are connected. The solar cell strings 22 at both ends are connected to bus bars 16. The bus bar 16 at one end is connected to the solar cell string 22 on a high-potential side in the second direction D2, and the bus bar 16 at the other end is connected to the solar cell string 22 on a low-potential side in the second direction D2.

In the thus configured solar cell module 10, one solar cell connection unit 21 constitutes one series circuit in which six solar cells 14 are connected in series, and one solar cell string 22 contains six solar cell connection units 21. A positive electrode terminal of a solar cell connection unit 21 is electrically connected with a negative electrode terminal of an adjacent solar cell connection unit 21. In this electric circuit, the solar cell module 10 as a whole constitutes one series circuit.

Figure 3:
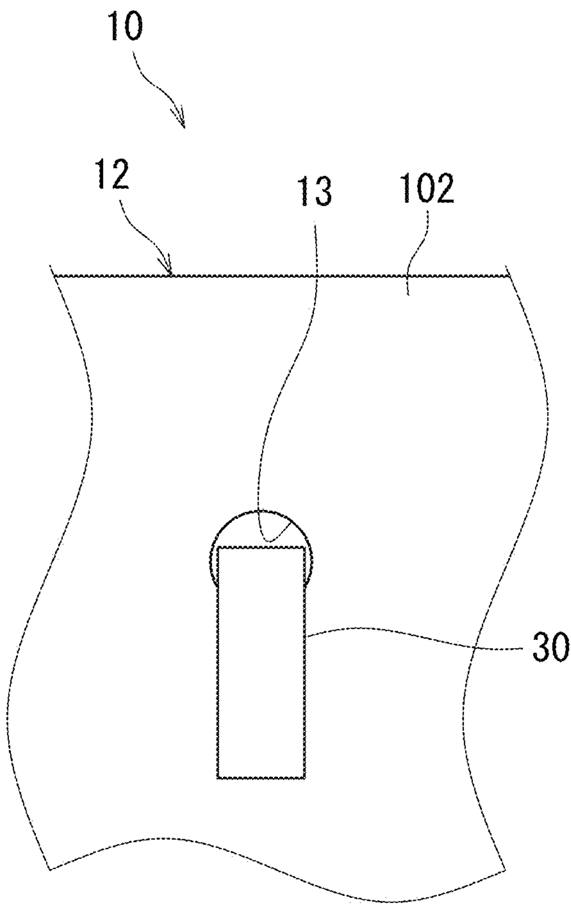
FIG. 3 is an enlarged view showing a part of a back surface side of the solar cell module.

As shown in FIG. 1, the solar cell module 10 includes a plurality of output wiring members 30 for extracting the output. FIG. 3 is an enlarged view showing a part of the back surface 102 side of the solar cell module 10. FIG. 3 shows an outlet 13 that penetrates the back surface protection member 12. The output wiring members 30 are connected to the bus bars 16, 17, 18 and drawn out to the back surface 102 side of the solar cell module 10.

Each output wiring member 30 is a band-like conductor plate. For example, the output wiring member 30 is a band-like wiring member (a bus bar) made of an elongated ribbon-like (or strip-like) substrate whose outer surface is coated with a conductive adhesive or coated by soldering. The material for the substrate is not particularly limited and, for example, may be a metal such as copper. The output wiring members 30 connected to the bus bars 16, 17, 18 are drawn out through the outlets 13 to the back surface 102 side of the solar cell module 10, and serve as output lines for external connection.

In the output line connection structure for the solar cell module 10 according to the present embodiment, the output wiring member 30 drawn out to the back surface 102 side is provided for each solar cell connection unit 21. In the back surface protection member 12, the outlets 13 are formed in positions corresponding to starting ends and terminating ends of the respective solar cell connection units 21. The outlets 13 may be formed at the same position in the first direction D1 as the bus bars 16, 17, 18, or may be formed closer to the ends of the solar cell module 10 in the first direction D1 relative to the bus bars 16, 17, 18.

First ends of the output wiring members 30 are connected to the bus bars 16, 17, 18 positioned at the starting ends or the terminating ends of the solar cell connection units 21. The output wiring members 30 extend out to the back surface 102 side, in the vicinity of their connection points with the bus bars 16, 17, 18. To reduce the resistance in the bus bars 16, 17, 18 and the output wiring members 30, and also to avoid enlargement of the solar cell module 10, the positions for drawing out the output wiring members 30 to the back surface 102 side are preferably as close as possible to the connection points between the output wiring members 30 and the bus bars 16, 17, 18.

The connection points between the output wiring members 30 and the bus bars 16, 17, 18 may be either at the ends of or at intermediate positions of the bus bars 16, 17, 18 extending in the second direction D2. The connection points between the output wiring members 30 and the bus bars 17, 18 at intermediate positions in the second direction D2 may be set between two solar cell connection units 21. Additionally, the connection points between the output wiring members 30 and the bus bars 16, 17, 18 may be set such that the connection points at the first end and the connection points at the second end in the first direction D1 of the solar cell module 10 correspond in the second direction D2. Any of these configurations can avoid interference between the bus bars 17, 18/the output wiring members 30 and other components, and can improve the external design of the solar cell module 10.

At the first end in the first direction D1 of the solar cell module 10, the bus bars 16 and the bus bars 18 are not aligned in the first direction D1 but arranged in a line in the second direction D2. Similarly, at the second end of the solar cell module 10, the plurality of bus bars 17 are not aligned with each other in the first direction D1 but arranged in a line in the second direction D2.

The output wiring members 30 are inserted into the outlets 13 that penetrate the back surface protection member 12 of the solar cell module 10, and then the output wiring members 30 are drawn out to the back surface 102 side of the solar cell module 10. Eventually, each of the output wiring members 30 extends to an outside of the back surface protection member 12 at the starting end and the terminating end of the corresponding solar cell connection unit 21.

As shown in FIG. 2, the output wiring members 30 are drawn out at a plurality of locations on the back surface protection member 12 at opposite ends thereof in the first direction D1. Further as shown in FIG. 1 and FIG. 3, the bus bars 16, 17, 18 extend in the second direction D2, and the output wiring members 30 to be drawn out to the back surface 102 side are connected to the bus bars 16, 17, 18 in such a manner that the output wiring members 30 extend in the first direction D1. To be more specific, the output wiring members 30 in the illustrated configuration are arranged in the first direction D1, with their extreme ends oriented inwardly of the solar cell module 10.

Additionally, the output wiring members 30 may be connected to the bus bars 16, 17, 18, with their extreme ends oriented outwardly in the first direction D1 of the solar cell module 10. In a case where the output wiring members 30 are connected in an outwardly orientated manner to the bus bars 16, 17, 18 that extend in the second direction D2, the output wiring members 30 and the outlets 13 are invisible in the vicinity of the solar cells 14, and can improve the external design of the solar cell module 10. In this case, the output wiring members 30 drawn out to the back surface 102 side are bent such that the extreme ends of the output wiring members 30 are oriented inwardly of the solar cell module 10.

Further, the output wiring members 30 may be separate wiring members to be electrically connected with the bus bars 16, 17, 18 by welding, soldering, etc. Alternatively, the output wiring members 30 may be integrated with the bus bars 16, 17, 18.

On the back surface 102 side of the solar cell module 10, the output wiring members 30 are insulated by coating. For example, each output wiring member 30 may be covered by an insulating member such as an insulating film (tape) or silicone. Alternatively, additional connection wiring members 31 that are insulated by coating may be interposed between the outlets 13 and the terminal box 40 (more specifically, between the outlets 13 and terminals 42 to be described later) to establish connections therebetween. In the example of FIG. 2, the output wiring members 30 are equipped with the insulation-coated connection wiring members 31, and establish electrical continuity with the terminal box 40 via the connection wiring members 31.

The terminal box 40, as shown in FIG. 2, is disposed on the back surface protection member 12 of the solar cell module 10. Referring back to the conventional structure shown in FIG. 7, the output wiring members 62 are drawn out through the single slit 61 provided in the back surface 602 side of the solar cell module 60, and the terminal box 63 for extracting the output of the solar cell module 60 is attached to cover the output wiring members 62 and the slit 61. In contrast, the terminal box 40 in the present embodiment is attached at a position apart from the outlets 13 in an in-plane direction of the back surface protection member 12.

Figure 4:
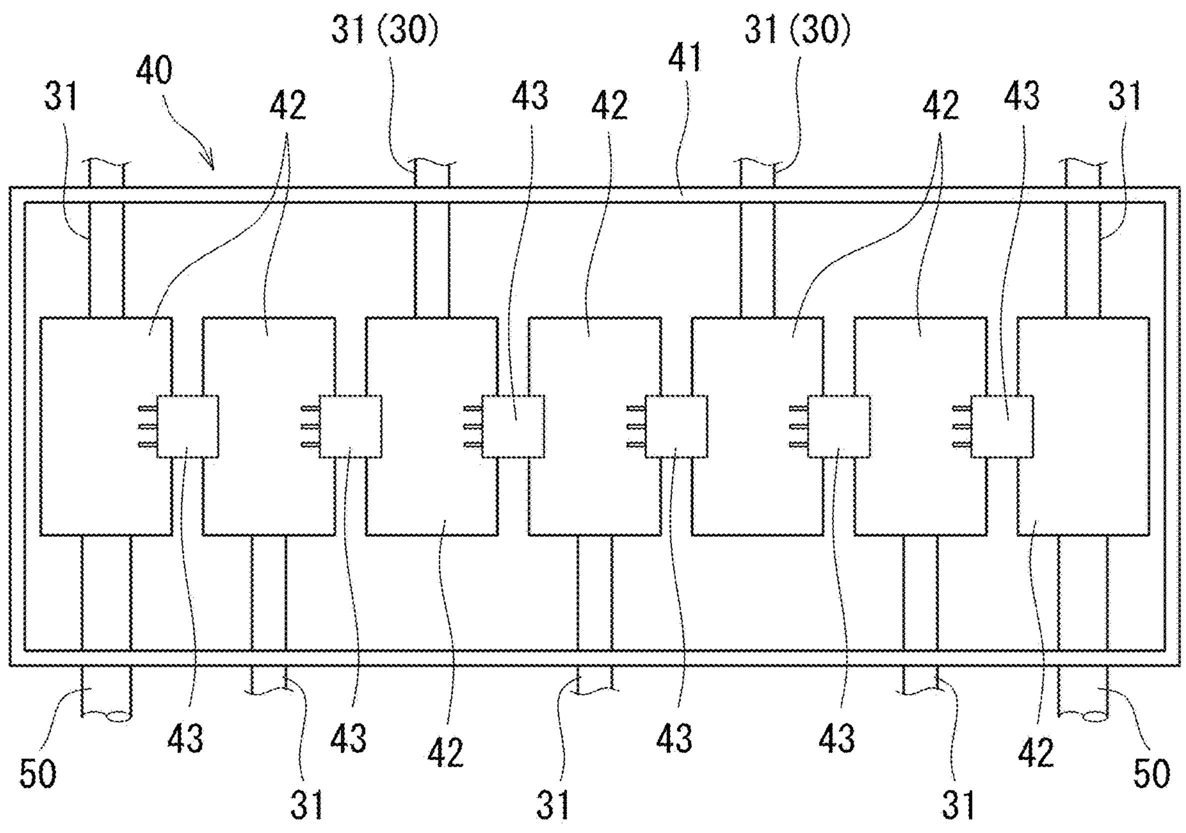
FIG. 4 is a schematic plan view showing an example of a terminal box provided in the solar cell module.

FIG. 4 is a schematic plan view showing an example of the terminal box 40 provided in the solar cell module 10. The terminal box 40 is attached to the back surface 102 of the solar cell module 10 (specifically, to the back surface protection member 12), and has a box body 41 that is open to a side opposite to the attachment surface. The box body 41 is internally sealed with resin and closed by a lid (not shown). Note that FIG. 4 shows the box body 41 in an open state in order to show an internal structure.

In the terminal box 40, the box body 41 contains a plurality of terminals (terminal ships) 42 connected with the output wiring members 30, a plurality of bypass diodes 43 respectively connected in parallel with the plurality of solar cell connection units 21, and cables 50 for external connection that electrically connect the plurality of terminals 42 with an external device. The connection wiring members 31 have their first ends connected with the output wiring members 30 of the solar cell module 10, and have their second ends electrically connected with the terminals 42 by welding, soldering, etc.

Each of the bypass diodes 43 is disposed between two adjacent terminals 42. In the illustrated configuration, the terminal box 40 includes six bypass diodes 43. In the terminal box 40, each of the bypass diodes 43 is electrically connected between the starting end and the terminating end of a corresponding one of the solar cell connection units 21.

The solar cell module 10 includes six solar cell connection units 21. An anode of each bypass diode 43 is connected to a negative electrode terminal of a corresponding solar cell connection unit 21, and a cathode of the bypass diode 43 is connected to a positive electrode terminal of the same solar cell connection unit 21. Accordingly, each bypass diode 43 is connected to the starting end and the terminating end of the solar cell connection unit 21 in which six solar cells 14 are arranged in a line, and thus is connected in parallel with the solar cell connection unit 21. The plurality of terminals 42 is connected in series with each other via the plurality of bypass diodes 43. This configuration can provide a bypass that serves when a trouble occurs in a part of the solar cells 14.

When the power generation state of the solar cell module 10 is normal, no electric current flows through the bypass diodes 43. However, when a part of the solar cells 14 is in the shade of a certain structure or the like, the solar cell module does not generate a sufficient power. Then, the shaded solar cells 14 turn into resistance elements, consume electric power, generate back bias, and activate the bypass diode 43. Eventually, the solar cell connection unit 21 including the shaded solar cells 14 can be bypassed.

In the solar cell module 10, each of the solar cell connection units 21 is provided with a corresponding output wiring member 30 and is connected in parallel with a corresponding bypass diode 43. This configuration can limit the influence of shading to the six solar cells 14 that include the shaded solar cells 14, and can minimize the influence of partial shading of the solar cells 14.

Figure 5:
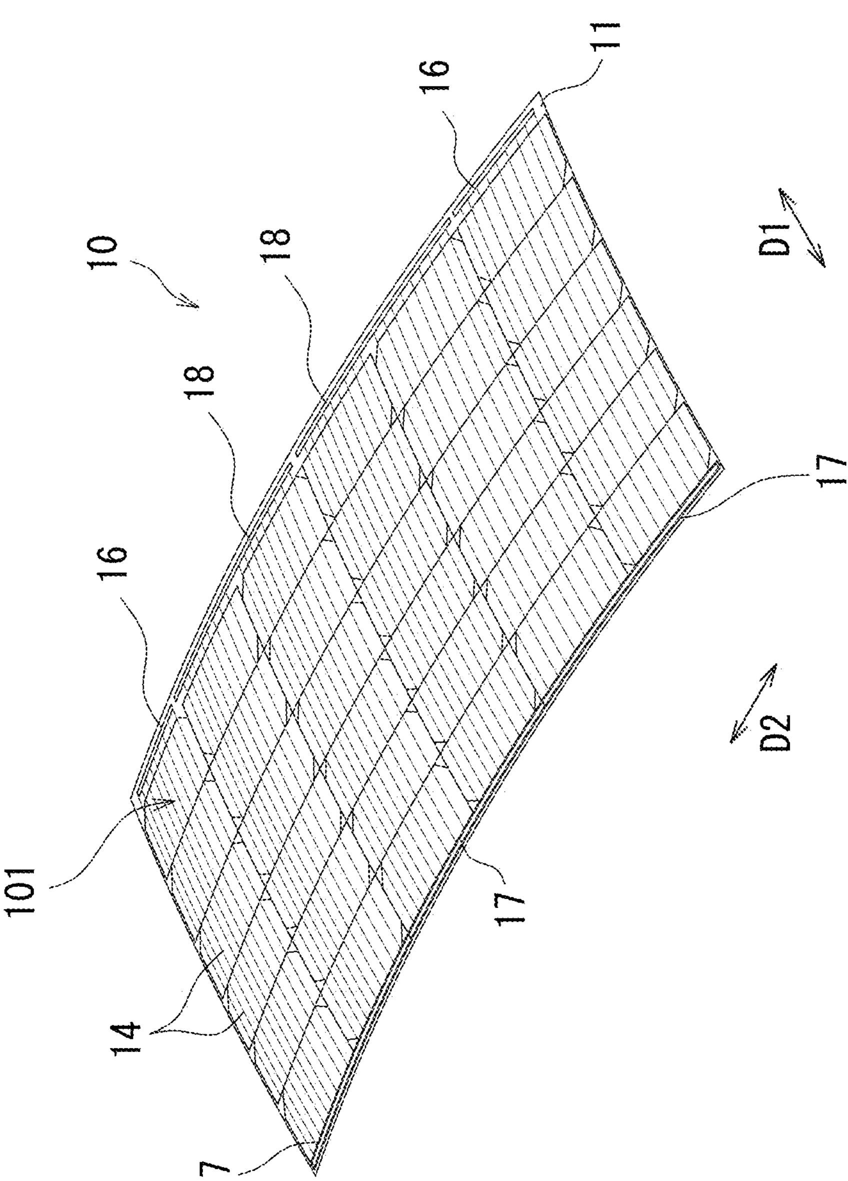
FIG. 5 is a perspective view showing another example of the solar cell module including the output line connection structure.

FIG. 5 is a perspective view showing another example of the solar cell module 10 including the output line connection structure according to the present embodiment. The solar cell module 10 as a whole may have a curved shape that is bent in the first direction D1 and in the second direction D2. The plurality of solar cells 14 is arranged along the curved transparent substrate 11. Such a solar cell module 10 can be suitably mounted on a curved part, for example, on a roof of a vehicle or the like.

When the solar cell module 10 is installed on a vehicle or the like, irrespective of whether the solar cell module 10 has a flat shape or a curved shape, the space on the back surface 102 side of the solar cell module 10 is often limited, and the area where the terminal box 40 is mountable may be strictly restricted. In this respect, the output line connection structure according to the present embodiment is configured to establish wire connections, with the output wiring members 30 being drawn out to the outside of the back surface protection member 12. This configuration remarkably improves the degree of freedom in the position of the terminal box 40 and is easily adaptable to various installation modes.

Referring again to the conventional structure described above, when the terminal box 76 is positioned at a central part on the back surface side, the output wiring members 75 and the like are enclosed in the solar cell module 70 as far as the position of the terminal box 76. This conventional structure causes following problems. For one, this structure requires complex routing of the output wiring members 75 and the like inside the solar cell module 70. For another, when the output wiring members 75 and the like are sealed with respect to the back surface protection member, this structure requires insulation of the output wiring members 75 and the like from the plurality of solar cells 71 and thus requires a wiring operation with use of insulating films or the like.

In contrast, the output line connection structure for the solar cell module 10 according to the present disclosure can solve these problems by enabling wire connections of the output wiring members 30 on the outside of the back surface protection member 12, thereby avoiding complex internal wiring and ensuring an easy wiring operation. As a result, this configuration is applicable to various types of photovoltaic power systems. Further, as described above, this configuration can minimize the influence of shading that affects a part of the solar cells 14, and can prevent a decrease in power generation efficiency of the solar cell module 10.

(Other Embodiments)

The output line connection structure for a solar cell module according to the present disclosure is not limited to the configurations described in the above embodiment, and may be carried out in other various forms.

For example, the output wiring members 30 in the above embodiment are separate wiring members to be connected with the bus bars 16, 17, 18. Instead, the output wiring members 30 may be integrated with the bus bars 16, 17, 18, for example, as shown in FIG. 6.

Figure 6:
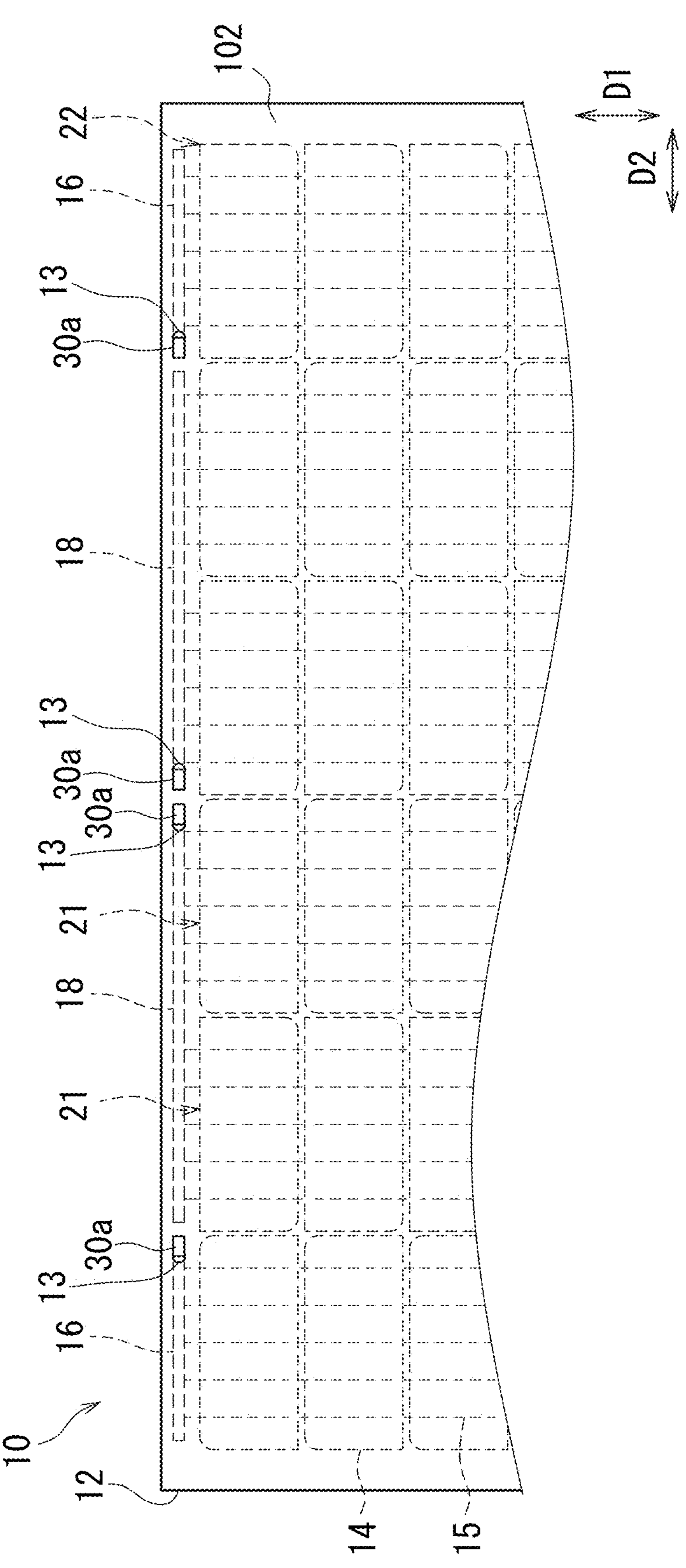
FIG. 6 is a schematic bottom view showing a main part of an output line connection structure for a solar cell module according to another embodiment of the present disclosure.
Figure 7:
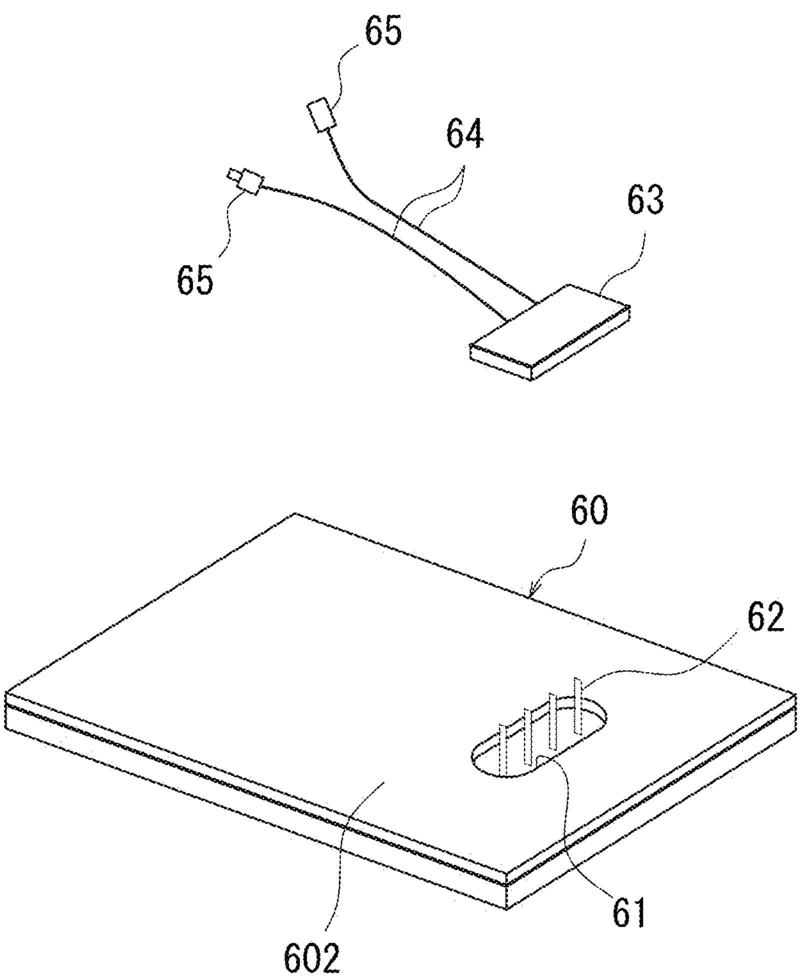
FIG. 7 is a perspective view showing an example of a conventional output line connection structure for a solar cell module.
Figure 8:
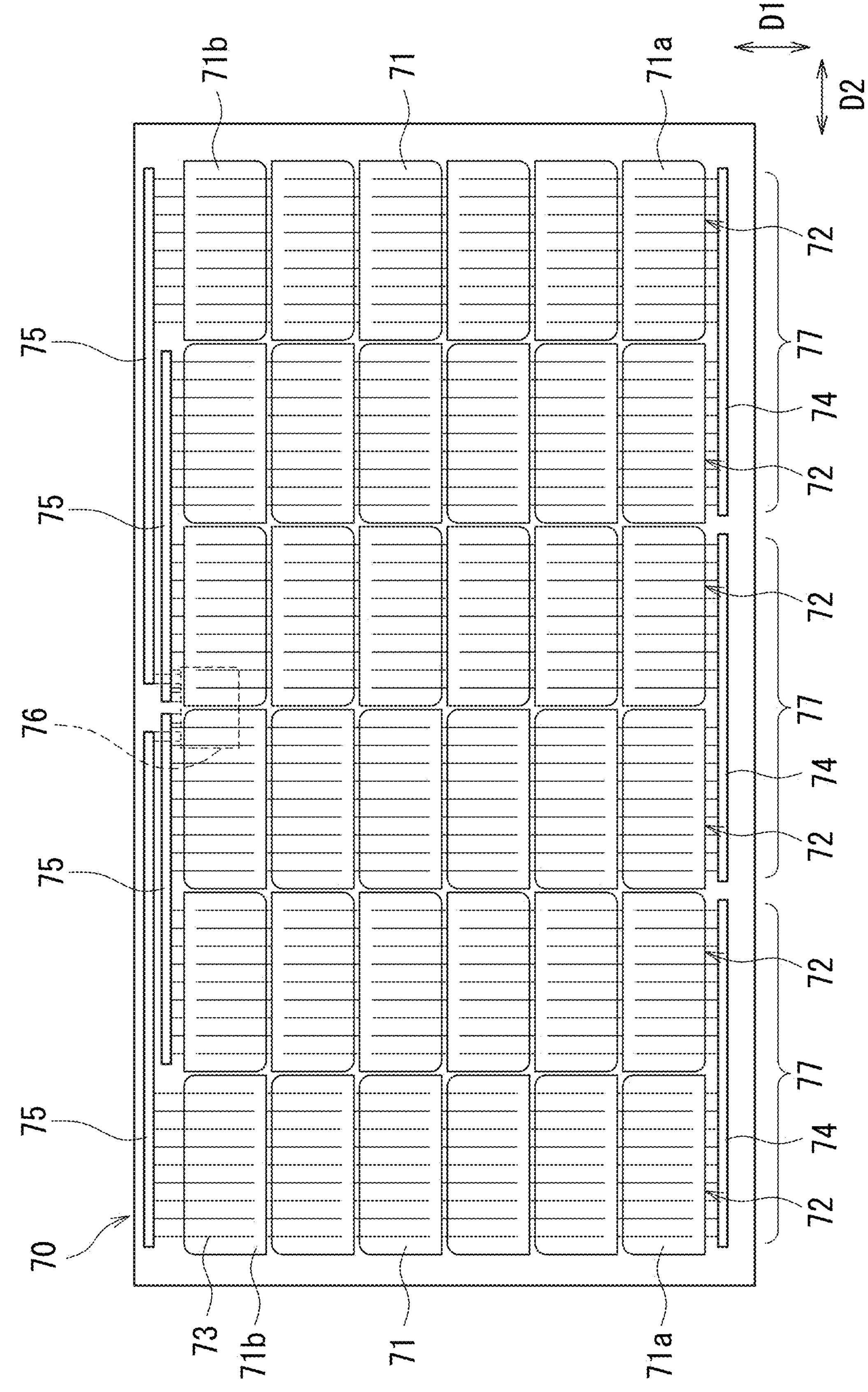
FIG. 8 is a plan view showing another example of the conventional output line connection structure for a solar cell module.

FIG. 6 is a schematic bottom view showing a main part of an output line connection structure for the solar cell module 10 according to another embodiment of the present disclosure, as seen from the back surface 102 side of the solar cell module 10. In FIG. 7, the solar cells 14, the bus bars 16, 18, and some other components are shown by dashed lines because these components are covered by the back surface protection member 12 and invisible from the back surface 102 side.

The solar cells 14 are mutually connected in series in the first direction D1 by the wiring members 15 such that the plurality of solar cells 14 is arranged in a line to form the series-connected solar cell connection unit 21. An end of the solar cell connection unit 21 is connected to one of the bus bars 16, 18. The bus bars 16, 18 are arranged in the second direction D2, and either of their first ends or second ends are drawn out through the outlets 13 to the back surface 102 side of the solar cell module 10. The outlets 13 in the back surface protection member 12 are positioned so as not to interfere with the adjacent bus bars 16, 18 and the solar cells 14. Preferably, the outlets 13 are provided closer to the ends of the bus bars 16, 18 relative to the connection points between the bus bars 16, 18 and the wiring members 15.

As shown in FIG. 6, the first ends of the bus bars 16, 18 can be drawn out through the outlets 13 to the back surface 102 side, with their orientation unchanged and kept in a routing direction that extends in the second direction D2. The first ends of the bus bars 16, 18 can then establish wire connections as output wiring members 30*a*. The output wiring members 30*a* extending outwardly to the back surface 102 side can be connected to the connection wiring members 31 that are insulated by coating just as in the above embodiment, and can be connected via the connection wiring members 31 to the terminal box 40. Alternatively, the output wiring members 30*a* may be connected directly to the terminal box 40 without the connection wiring members 31. The bus bars 17, not shown in FIG. 6, may be configured in a similar manner.

According to this configuration, the ends of the bus bars are drawn out to the back surface side and serve as the output wiring members, with their orientation unchanged and kept in the routing direction. This configuration does not require a connection operation between the bus bars and the output wiring members, a processing operation for orienting the extreme ends of the output wiring members inwardly or outwardly in the first direction D1, or other additional operations. As a result, this configuration can simplify the operational steps and enhance work efficiency. Besides, this configuration enables wire connections of the output wiring members on the outside of the back surface protection member, thereby avoiding complex internal wiring and ensuring an easy wiring operation. As a result, this configuration is applicable to various types of photovoltaic power systems.

Regarding the output line connection structure for a solar cell module according to the present disclosure, the number of solar cells 14 contained in each solar cell connection unit 21 in the solar cell module 10 is optional and should not be limited to six as exemplified in the above embodiments. When the number of serial connections in the solar cells 14 constituting each solar cell connection unit 21 is reduced, the influence by the shaded solar cells 14 can be prevented further.

The attachment position of the terminal box 40 in the in-plane direction of the back surface protection member 12 is not limited to a position apart from all of the outlets 13. Instead, the terminal box 40 may be disposed very close to the outlets 13 or may overlap the outlets 13. For example, the terminal box 40 provided in the solar cell module 10 may cover a part of the plurality of outlets 13. In this case, for example, the terminal box 40 may cover one of the outlets 13 and be apart from the other five outlets 13. This configuration also enables wire connections of the output wiring members 30 on the outside of the back surface protection member 12, thereby avoiding complex internal wiring and ensuring an easy wiring operation and a high degree of freedom in positioning.

Further in the solar cell module 10, each of the bus bars 16, 17, 18 is provided with the output wiring member 30 and connected in parallel with the bypass diode 43, but this may be applied to a part of the bus bars. In the case where each of the bus bars 16, 18 is provided with the output wiring member 30 and connected in parallel with the bypass diode 43, the influence by the shaded solar cells 14 can be reduced according to the number of solar cells 14 contained in two solar cell connection units 21.

The above-described embodiments are considered in all respects as illustrative and not restrictive. Therefore, the technical scope of the present disclosure should not be construed only by the foregoing embodiments but should be defined by the appended claims. All variations and modifications falling within the equivalency range of the appended claims are intended to be embraced therein.

The present application claims priority under Japanese Patent Application No. 2022-144527, filed on Sep. 12, 2022, the contents of which are incorporated herein by reference in its entirety.

REFERENCE SIGNS LIST

10 solar cell module
101 light-receiving surface
102 back surface
11 transparent substrate
12 back surface protection member
13 outlet
14 solar cell
15 wiring member
16, 17, 18 bus bar
21 solar cell connection unit
22 solar cell string
30, 30*a* output wiring member (output line)
31 connection wiring member
40 terminal box
41 box body
42 terminal
43 bypass diode
50 cable for external connection
D1 first direction
D2 second direction

The invention claimed is:

1. An output line connection structure for a solar cell module, the output line connection structure connecting output wiring members in the solar cell module to a terminal box, the solar cell module comprising:

a solar cell string that is sealed between a transparent substrate and a back surface protection member positioned as a backside surface of the solar cell module, the solar cell string comprising a plurality of solar cells connected in series to each other, wherein:

the solar cell string further comprises a plurality of solar cell connection units in each of which a plurality of solar cells adjacent in a first direction is connected in series to each other, a plurality of bus bars is provided at a starting end and a terminating end of each of the solar cell connection units, such that two of the solar cell connection units, in the plurality of solar cell connection units, that are adjacent in a second direction, orthogonal to the first direction, are connected in series to each other, each of the output wiring members has a first end thereof connected to a corresponding one of the plurality of bus bars, and has a second end thereof establishing electrical continuity with the terminal box, each of the output wiring members extends to an outside of the back surface protection member through an outlet, of a plurality of outlets, that penetrates the back surface protection member, wherein the plurality of outlets is provided at a plurality of locations at opposite ends in the first direction of the back surface protection member, and the plurality of outlets of the output wiring members and the terminal box are positioned apart from each other in an in-plane direction of the back surface protection member.

2. The output line connection structure for the solar cell module according to claim 1, wherein a portion of each output wiring member extending from a corresponding outlet, in the plurality of outlets, to the outside of the back surface protection member is insulated by coating.

3. The output line connection structure for the solar cell module according to claim 1, wherein each of the output wiring members is equipped with a connection wiring member insulated by coating, and connects a corresponding outlet, in the plurality of outlets, to the terminal box via the connection wiring member.

4. The output line connection structure for the solar cell module according to claim 1, wherein:

the terminal box comprises a plurality of terminals and a plurality of bypass diodes, the plurality of terminals is connected, respectively, to the output wiring members, and the plurality of bypass diodes is connected, respectively, in parallel with the plurality of solar cell connection units.

5. The output line connection structure for the solar cell module according to claim 4, wherein each of the plurality of bypass diodes disposed in the terminal box electrically connects the starting end and the terminating end of a corresponding one of the solar cell connection units.

* * * * *